United States Patent [19]

Sanders

[11] Patent Number: 5,022,591
[45] Date of Patent: Jun. 11, 1991

[54] CORDLESS PEPPER MILL

[76] Inventor: Robert L. Sanders, P.O. Box 674, Bay City, Tex. 77414

[21] Appl. No.: 441,296

[22] Filed: Nov. 27, 1989

[51] Int. Cl.$^5$ ............................................. A47J 42/06
[52] U.S. Cl. ................................. 241/169.1; 241/258; 241/261.1
[58] Field of Search ...................... 241/168, 169, 169.1, 241/261.1, 258, 259

[56] References Cited

U.S. PATENT DOCUMENTS

| | | |
|---|---|---|
| 2,688,448 | 9/1954 | Lenz . |
| 3,371,874 | 3/1968 | Reeves et al. . |
| 3,578,253 | 5/1971 | Brilliant ............................ 241/169.1 |
| 4,121,779 | 10/1978 | Mills et al. . |
| 4,509,698 | 4/1985 | David . |
| 4,685,625 | 8/1987 | Mazza .......................... 241/169.1 X |
| 4,771,955 | 9/1988 | Paulson . |

OTHER PUBLICATIONS

European Patent Application, 8-1985.

Primary Examiner—Mark Rosenbaum
Attorney, Agent, or Firm—Jerry T. Kearns

[57] ABSTRACT

A cordless pepper mill has an elongated housing enclosing a rotary mill, a gear reduction unit having an output shaft connected to the mill, a motor having an output shaft connected to the gear reduction unit, a rechargeable battery for driving the motor and a switch for selectively connecting the battery to the motor. The housing has a cylindrical end portion dimensioned for frictional engagement within a cylindrical recess formed in a top surface of a recharging unit. Cooperating electrical contacts within the recess and on the housing are engageable to provide a recharging current to the rechargeable battery within the housing. The actuating switch is a push button switch spring biased to an off position disposed on a top end wall of the housing for convenient access. The rotary grinding mill has a frusto conical shape and is provided with a plurality of circumferentially spaced alternating trapezoidal lands and trapezoidal flutes. The mill is mounted for rotation in an oppositely tapering frusto conical seat with a minimum clearance space.

1 Claim, 4 Drawing Sheets

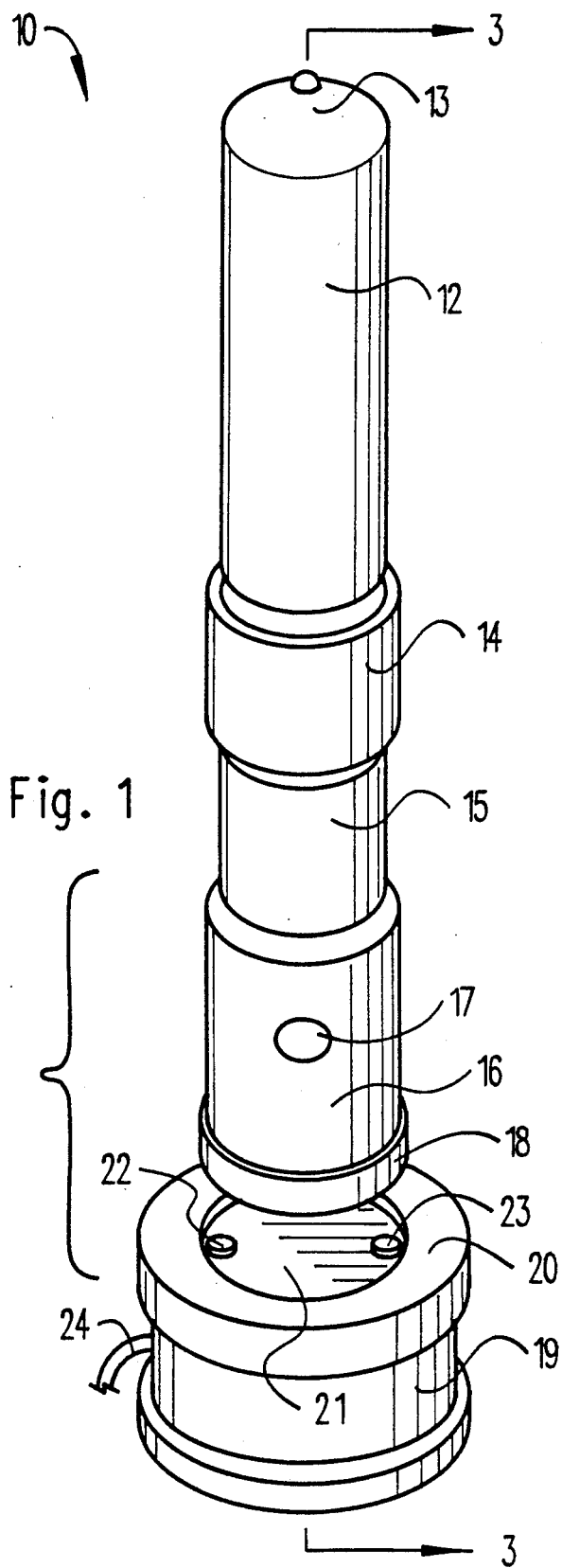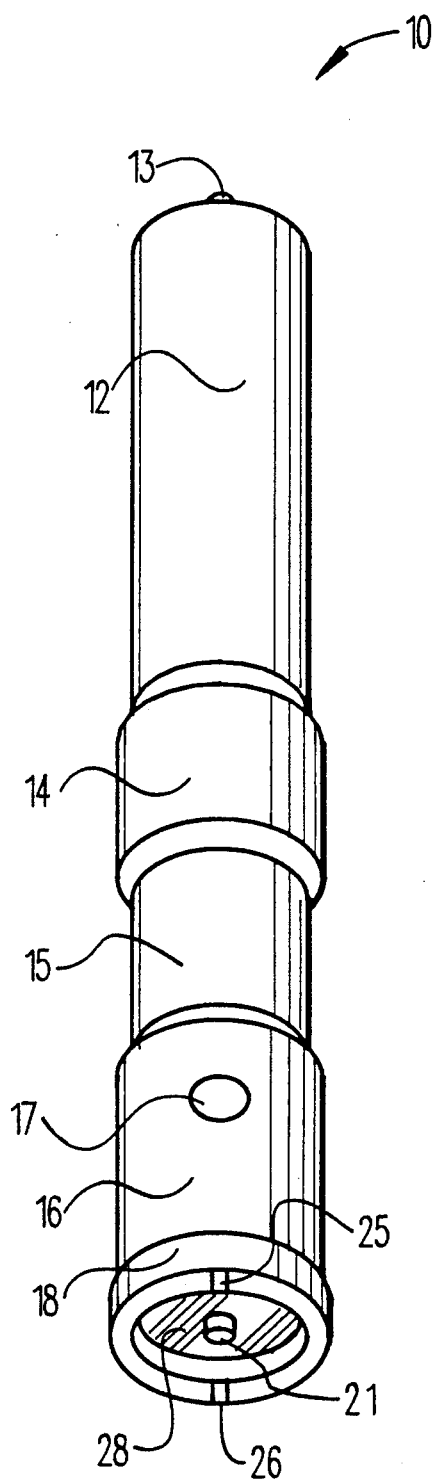

CORDLESS PEPPER MILL

BACKGROUND OF THE INVENTION

1. Field of the Invention

The present invention relates to pepper mills, and more particularly pertains to a battery powered cordless electric pepper mill. Various conventional pepper mills utilize a variety of mechanical mechanisms for grinding pepper corns. These prior art devices are relatively cumbersome to manipulate and do not produce uniform pepper flakes. In order to overcome this problem, the present invention provides a cordless, rechargeable pepper mill which utilizes a gear reduction unit to provide an improved grinding operation.

2. Description of the Prior Art

Various types of pepper mills are known in the prior art. A typical example of such a pepper mill is to be found in U.S. Pat. No. 2,688,448, which issued to H. Lenz on Sept. 7, 1954. This patent discloses a hand crank driven pepper mill utilizing a frusto conical rotary mill disposed within a fluted cylindrical seat. U.S. Pat. No. 3,371,874, which issued to S. Reeves et al on Mar. 5, 1968, discloses a manually manipulable pepper mill utilizing a helically fluted mill disposed within a fluted seat. U.S. Pat. No. 4,121,779, which issued to P. Mills et al on Oct. 24, 1978, discloses a battery powered stirring implement for crushing various dried spices. U.S. Pat. No. 4,509,698, which issued to T. David on Apr. 9, 1985, discloses a manually operable pepper mill having a frusto conical mill mounted within a cylindrical seat. The device includes a reciprocal operating lever and a one-way clutch for transmitting rotary force to the grinding mill. U.S. Pat. No. 4,771,955, which issued to J. Paulson on Sept. 20, 1988, discloses a pepper mill provided with an end closure for releasably closing the outfeed opening against unintentional discharge of ground pepper. The device utilizes a tapering mill provided with a circumferential array of alternating flutes and lands mounted for rotation within a tapering seat.

While the above mentioned devices are directed to pepper mills, none of these devices disclose a cordless, battery operated, rechargeable pepper mill which utilizes a recharging unit provided with a cylindrical recess dimensioned for frictional engagement with a cylindrical end portion of the pepper mill housing. An additional feature of the present invention, not contemplated by the aforesaid prior art devices, include the provision of a frusto conical rotary mill provided with a plurality of circumferentially spaced alternating trapezoidal flutes and lands mounted for rotation with a minimum clearance within an oppositely tapering frusto conical seat. Inasmuch as the art is relatively crowded with respect to these various types of pepper mills, it can be appreciated that there is a continuing need for and interest in improvements to such pepper mills, and in this respect, the present invention addresses this need and interest.

SUMMARY OF THE INVENTION

In view of the foregoing disadvantages inherent in the known types of pepper mills now present in the prior art, the present invention provides an improved cordless pepper mill. As such, the general purpose of the present invention, which will be described subsequently in greater detail, is to provide a new and improved cordless pepper mill which has all the advantages of the prior art pepper mills and none of the disadvantages.

To attain this, a representative embodiment of the concepts of the present invention is illustrated in the drawings and makes use of a cordless pepper mill which has an elongated housing enclosing a rotary mill, a gear reduction unit having an output shaft connected to the mill, a motor having an output shaft connected to the gear reduction unit, a rechargeable battery for driving the motor and a switch for selectively connecting the battery to the motor. The housing has a cylindrical end portion dimensioned for frictional engagement within a cylindrical recess formed in a top surface of a recharging unit. Cooperating electrical contacts within the recess and on the housing are engageable to provide a recharging current to the rechargeable battery within the housing. The actuating switch is a push button switch spring biased to an off position disposed on a top end wall of the housing for convenient access. The rotary grinding mill has a frusto conical shape and is provided with a plurality of circumferentially spaced alternating trapezoidal lands and trapezoidal flutes. The mill is mounted for rotation in an oppositely tapering frusto conical seat with a minimum clearance space.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cordless pepper mill which has all the advantages of the prior art pepper mills and none of the disadvantages.

It is another object of the present invention to provide a new and improved cordless pepper mill which may be easily and efficiently manufactured and marketed.

It is a further object of the present invention to provide a new and improved cordless pepper mill which is of a durable and reliable construction.

An even further object of the present invention is to provide a new and improved cordless pepper mill which is susceptible of a low cost of manufacture with regard to both materials and labor, and which accordingly is then susceptible of low prices of sale to the consuming public, thereby making such pepper mills economically available to the buying public.

Still yet another object of the present invention is to provide a new and improved cordless pepper mill which provides in the apparatuses and methods of the prior art some of the advantages thereof, while simultaneously overcoming some of the disadvantages normally associated therewith.

Still another object of the present invention is to provide a new and improved cordless pepper mill for grinding pepper corns with a minimum of effort.

Yet another object of the present invention is to provide a new and improved cordless pepper mill adapted for storage in a recharging base unit.

Even still another object of the present invention is to provide a new and improved cordless pepper mill having an improved rotary mill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective view illustrating the cordless pepper mill and recharging unit according to the present invention.

FIG. 2 is a perspective view further illustrating the cordless pepper mill of the present invention.

DESCRIPTION OF THE PREFERRED EMBODIMENT

Figure 3:
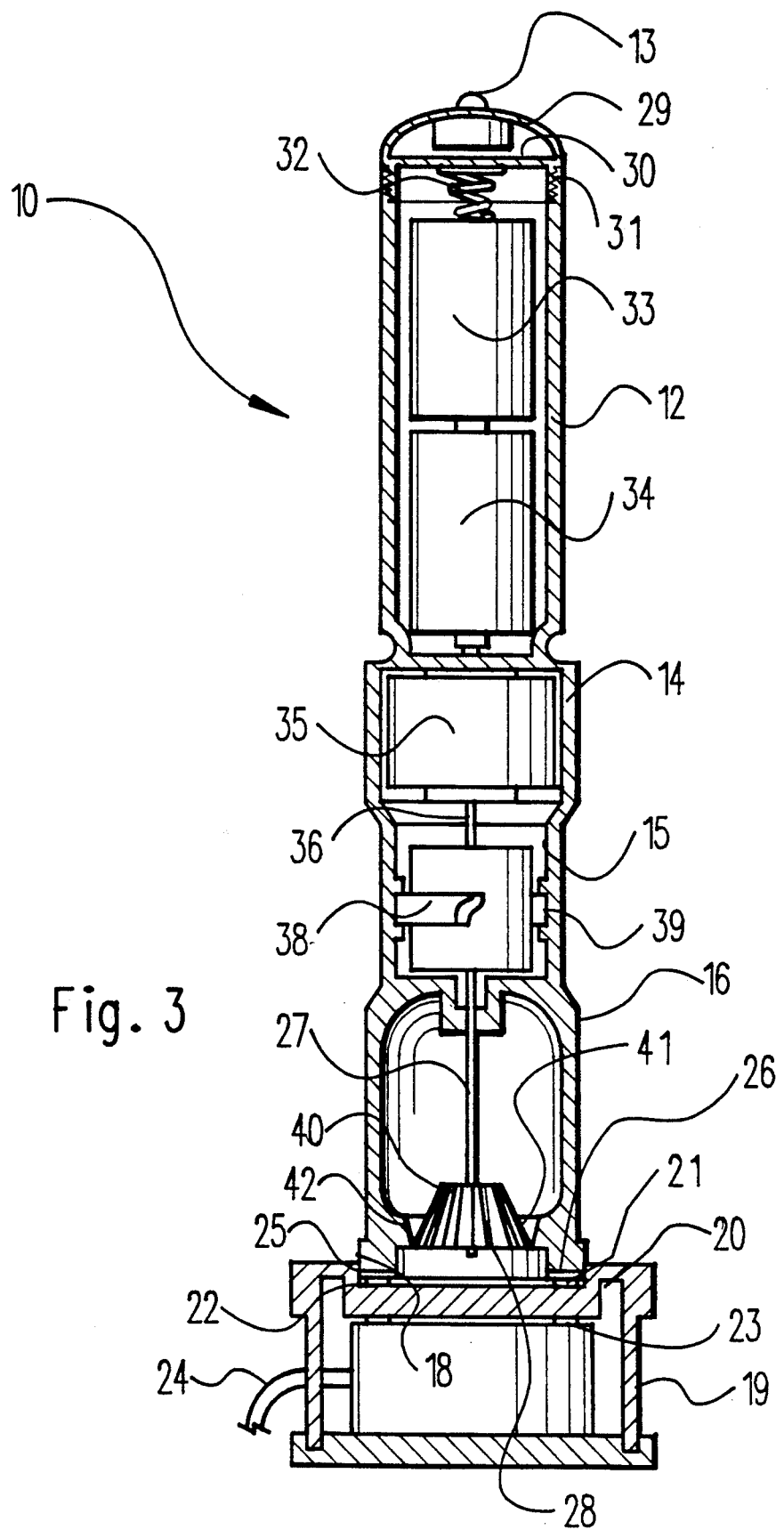
FIG. 3 is a longitudinal cross sectional view, taken along line 3—3 of FIG. 1.

With reference now to the drawings, and in particular to FIG. 1 thereof, a new and improved cordless pepper mill embodying the principles and concepts of the present invention and generally designated by the reference numeral 10 will be described.

More specifically, it will be noted that the first embodiment 10 of the invention includes an elongated generally cylindrical housing portion 12 which encloses a pair of conventional rechargeable batteries. A push button switch 13 is mounted on an exterior top end portion of the housing and is adapted for convenient actuation by the thumb of an individual. The switch 13 is preferably of the push button type which is spring biased to an extended off position. An intermediate step portion 14 of the housing encloses a conventional electric motor and is connected to a cylindrical housing portion 15 in which a conventional gear reduction unit is disposed. The gear reduction unit may be of the planetary type to provide a large grinding turk. An enlarged diameter housing portion 16 encloses a rotary grinding mill and also serves as a reservoir for unground pepper corns which may be introduced through a plug covered inlet 17. A bottom end portion 18 of the housing is provided with a cylindrical step ring 18 dimensioned for close fitting frictional engagement within a cylindrical recess 21 formed in the top surface of a recharging unit 19. The recess 21 includes a plurality of projections 22 and 23 which serve as electrical contacts. A power cord 24 is adapted for connection to a conventional source of AC power. The recharging unit 19 includes conventional circuitry which transforms AC current to a reduced voltage DC recharging power source.

As shown in FIG. 2, the cylindrical ring 18 includes a plurality of recessed electrical connections 25 and 26 dimensioned for engagement with the electrical contacts 22 and 23 (FIG. 1) provided on the recharging unit 19. The floor plate 28 is recessed within the ring 18 and includes a plurality of vent slits adapted to dispense ground pepper flakes. The distal end portion 27 of the rotary mill shaft is mounted for rotation through the end plate 28.

As shown in the cross sectional view of FIG. 3, the rechargeable batteries 33 and 34 are received in end to end relation within the housing portion 12. A conventional coil spring 32 forms an electrical contact and is secured to a transverse wall 30 formed on a threaded removable cap 29 adapted for connection at 31 to the housing portion 12. The push button switch 13 includes conventional electrical connections for selectively engaging the batteries 33 and 34 with the conventional electric motor 35. The rotary output shaft 36 of the motor 35 is connected to a conventional planetary gear reduction unit 37 disposed within the housing portion 15. The gear reduction unit 37 may include a circular rib 38 mounted within a groove 39 formed within the housing portion 15. It should be noted that the various portions of the housing may be formed by removable threaded connections, or the entire housing may be longitudinally split into separable housing halves. A rotary output shaft 27 of the gear reduction unit 37 is keyed for driving a frusto conical grinding mill 40. The mill 40 is tapering in a downwardly and outwardly direction and is mounted for rotation within an oppositely tapering frusto conical seat 41. This arrangement creates an apex portion 42 into which pepper corns are fed by gravity and thus forced into engagement with the rotary mill 40. A transverse cover plate 28 extends within a cylindrical recess formed within the cylindrical end ring 18 on the pepper mill housing. The end plate 28 serves as a rotary bearing support for the distal end of the shaft 27 and is provided with a plurality of vent slits or apertures for distributing ground pepper flakes. The cylindrical ring 18 is dimensioned for close fitting frictional engagement within the recess 21 formed in the top surface of the recharging unit 19. The projecting electrical contacts 22 and 23 of the recharging unit 19 mate with the recess electrical contacts 25 and 26 provided on an end face of the ring 18.

Figure 4:
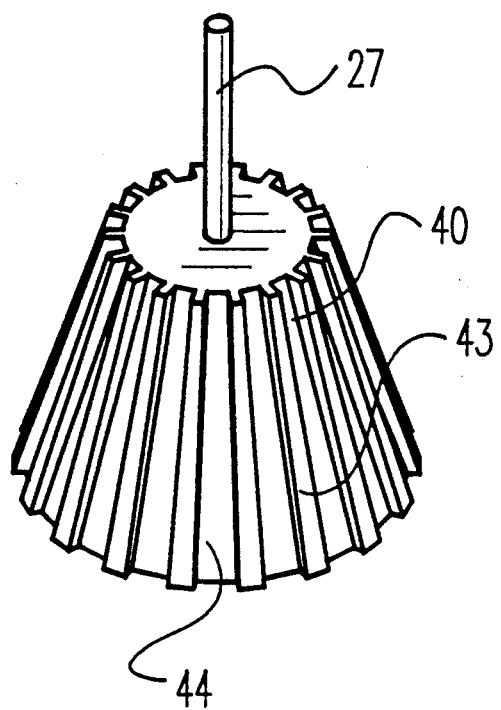
FIG. 4 is a perspective view illustrating the constructional detail of the rotary pepper corn grinding mill utilized in the cordless pepper mill of the present invention.

FIG. 4 is a perspective detail view which illustrates the frusto conical grinding mill 40. The mill 40 is provided with a circumferential array of alternating trapezoidal lands 43 and trapezoidal flutes 44. This allows an inexpensive construction, and provides an effective grinding implement when the mill 40 is disposed in the oppositely tapering seat within the pepper mill housing.

Figure 5:
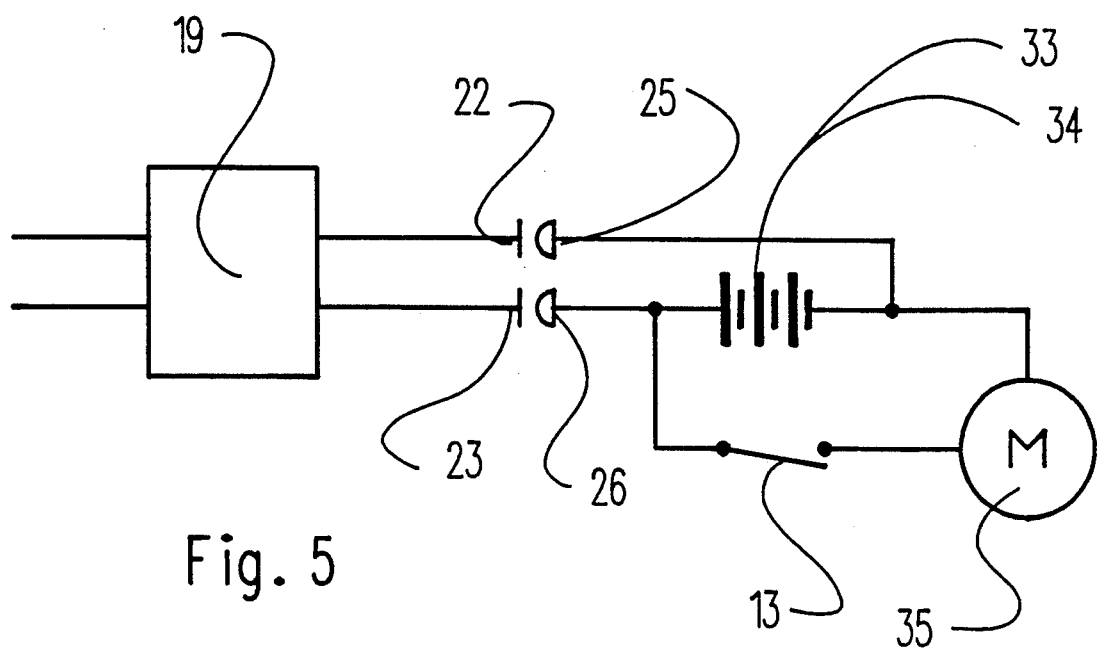
FIG. 5 is a schematic view illustrating the electrical components of the pepper mill of the present invention.

FIG. 5 is a schematic diagram which illustrates the electrical components of the rechargeable pepper mill. The recharging unit 19 includes electrical contacts 22 and 23 adapted for engagement with the electrical contacts 25 and 26 of the pepper mill housing, when the pepper mill is not in use. This ensures that the rechargeable batteries 33 and 34 are maintained in a fully charged condition, ready for use. The switch 13 connects the batteries 33 and 34 to energize the motor 35, thus actuating the pepper mill.

Figure 6:
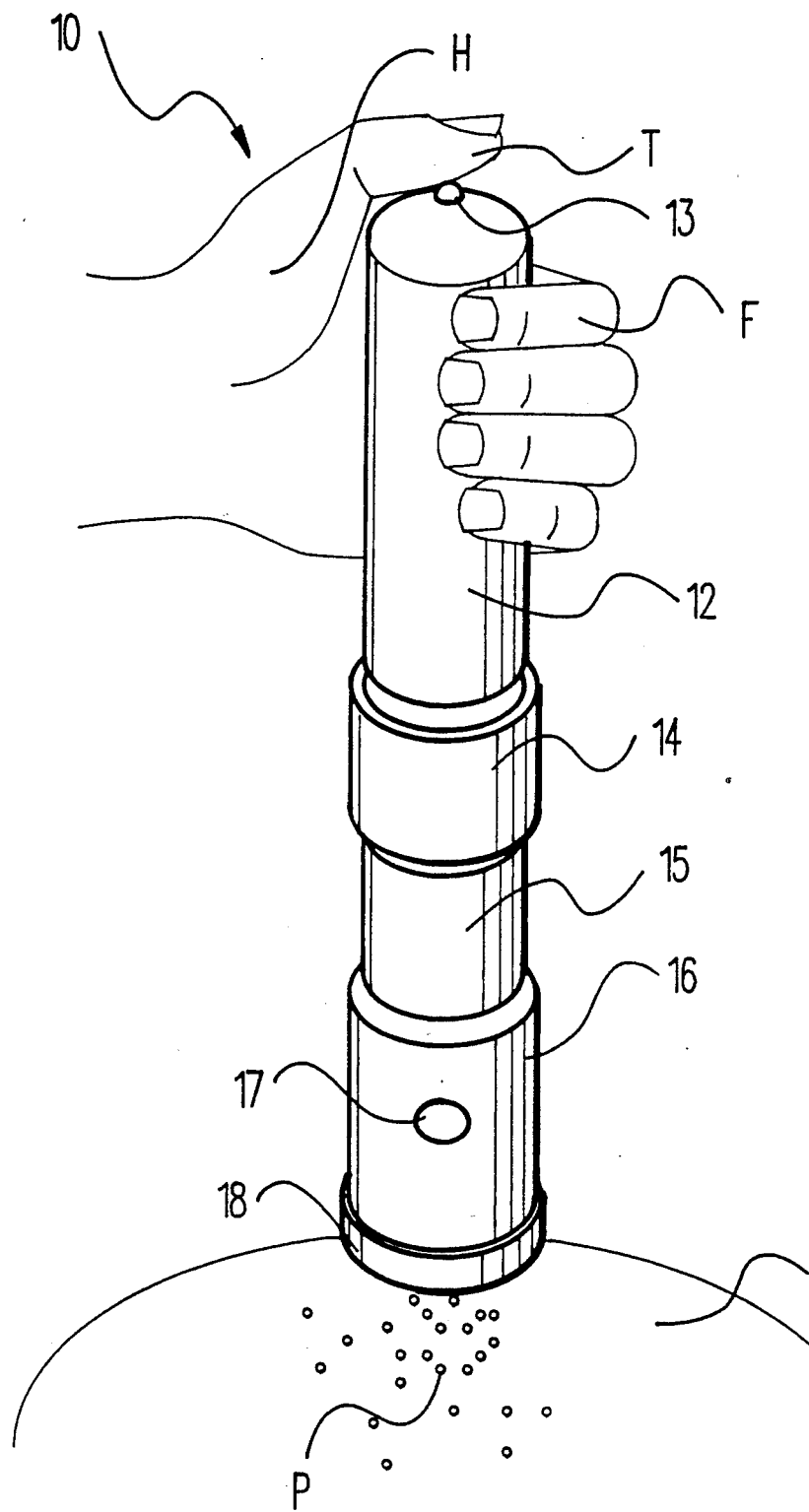
FIG. 6 is a perspective view illustrating the manner of the cordless pepper mill of the present invention.

FIG. 6 is a perspective view which illustrates the manner of using the pepper mill 10 according to the present invention. To dispense pepper flakes P on a food item within a dish D, an individual wraps the fingers F of one hand H around the upper cylindrical housing portion 12. The individual then depresses the push button power switch 13 utilizing their thumb T. When the desired quantity of pepper P has been dispensed, the push button 13 is released immediately stopping the grinding operation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cordless pepper mill, comprising:
an elongated housing having a bottom end;
a plurality of slits in said bottom end for discharging pepper flakes;
a mill in said housing for grinding pepper corns into pepper flakes;
said mill being frusto conical in shape and having larger and smaller diameter ends, said larger diameter end of said mill directed toward said bottom end of said housing and said smaller diameter end of said mill directed away from said bottom end of said housing, such that said mill tapers in diameter inwardly away from said bottom end of said housing;
means mounting said mill for rotation with a minimum clearance within an oppositely tapering frusto conical seat;
said seat having a smaller diameter end directed toward said bottom end of said housing and a larger diameter end directed away from said bottom end of said housing, such that said seat tapers inwardly in diameter toward said bottom end of said housing;
said mill having a plurality of circumferentially spaced alternating trapezoidal lands and trapezoidal flutes;
said lands and said flutes each having a flat trapezoidal face and two flat trapezoidal side walls, said side walls forming a right angle with said faces;
said trapezoidal flutes tapering in depth from a maximum depth adjacent said smaller diameter end of said mill to a minimum depth adjacent said larger diameter end of said mill;
said trapezoidal lands and said trapezoidal flutes tapering in width from a largest width adjacent said larger diameter end of said mill to a smallest width adjacent said smaller diameter end of said mill;
a motor in said housing;
a gear reduction unit connected to a rotary output shaft of said motor;
a rotary output shaft of said gear reduction unit connected to said mill;
a rechargeable battery in said housing for driving said motor;
a switch mounted on an exterior top end of said housing and spring biased to an off position for selectively connecting said battery to said motor;
a recharging unit for recharging said battery;
cooperating electrical contacts on said recharging unit and on said housing; and
said recharging unit having a top surface provided with a cylindrical recess and said housing having a cylindrical end portion dimensioned for frictional engagement within said recess.

* * * * *